United States Patent
Dries

(10) Patent No.: US 7,182,799 B2
(45) Date of Patent: Feb. 27, 2007

(54) FILTER ASSEMBLY COMPRISING FILTER ELEMENTS AND A FILTER GRID

(75) Inventor: Hubertus Wilhelmus Albertus Dries, Amsterdam (NL)

(73) Assignee: Shell Oil Company, Houston, TX (US)

(*) Notice: Subject to any disclaimer, the term of this patent is extended or adjusted under 35 U.S.C. 154(b) by 260 days.

(21) Appl. No.: 10/509,399

(22) PCT Filed: Mar. 25, 2003

(86) PCT No.: PCT/EP03/03229

§ 371 (c)(1),
(2), (4) Date: Sep. 24, 2004

(87) PCT Pub. No.: WO03/080221

PCT Pub. Date: Oct. 2, 2003

(65) Prior Publication Data

US 2005/0160707 A1    Jul. 28, 2005

(30) Foreign Application Priority Data

Mar. 26, 2002  (EP) .................................. 02076189

(51) Int. Cl.
*B01D 46/00* (2006.01)
(52) U.S. Cl. .................. 55/341.1; 55/302; 55/484; 95/280; 95/286
(58) Field of Classification Search .................. 95/280, 95/273, 278, 286, 279; 55/302, 484, 341.1, 55/283
See application file for complete search history.

(56) References Cited

U.S. PATENT DOCUMENTS

| 4,735,635 A | 4/1988 | Israelson et al. ............... 55/71 |
| 4,960,448 A | 10/1990 | Zievers ........................ 55/523 |
| 6,658,988 B1 * | 12/2003 | Dries .......................... 95/280 |

FOREIGN PATENT DOCUMENTS

| EP | 0551951 | 7/1995 |
| EP | 0601733 | 5/1999 |
| GB | 1227457 | 4/1971 |
| GB | 1242065 | 8/1971 |
| WO | 87/07180 | 12/1987 |

OTHER PUBLICATIONS

"The Dynamics of Fine Powder", K. Rietema, 1991, Esevier Science Publishers Ltd., pp. 53-56.

* cited by examiner

*Primary Examiner*—Duane Smith
*Assistant Examiner*—Sonji Turner

(57) ABSTRACT

A filter assembly having a plurality, preferably at least substantially vertically mounted, longitudinal elongated filter elements that are suitable for separating fluid from solid particles, having an open upper end sealed into a sealing device and a closed bottom end attached to a filter support that is mounted on a filter grid, in which the filter grid has a plurality of grid elements together forming a grid, wherein at least a portion of the cross-section of the grid elements between two adjacent filter elements is pointiform. The invention further pertains to a filter grid and a filter vessel containing at least one filter assembly.

19 Claims, 2 Drawing Sheets

FILTER ASSEMBLY COMPRISING FILTER ELEMENTS AND A FILTER GRID

The invention pertains to a filter assembly comprising a plurality of longitudinal elongated filter elements that are suitable for separating fluid from solid particles, having an open upper end sealed into a sealing device and a closed bottom end attached to a filter support that is mounted on a filter grid. The invention further pertains to said filter grid and to a filter vessel comprising the filter assembly.

More particularly, the present invention relates to an apparatus for filtering solid particles from a fluid containing solid particles. In many industrial processes, particularly elevated at high temperature or at high pressure, fluids are produced containing quantities of solid particles which must be removed before the fluids may be used, treated further, or released. For example, the ordinary combustion of coal produces an effluent gas containing flyash particles, which cannot be released to the atmosphere. Similarly, the gasification or partial oxidation of coal often produces a product gas stream which, after bulk removal of solids, contains from 0.1 percent to 4.0 percent by weight, based on the total weight of the gas and solids, of various solid particles which comprise flyslag or flyash and, in some cases, unburned coal. Again, fluid catalytic processes often produce gas or liquid streams containing residual catalyst "fines" which cannot be allowed to contaminate either the product or the environment.

To overcome this difficulty, a variety of treatment procedures may be used. For example, the residual solids-containing fluid may be passed continuously or intermittently through a filter or bank of discrete filter units. Intermittently, the filter(s) are cleaned or purged so that they do not become totally clogged. For example, the filter(s) may be subjected to a back-flush of gas or liquid, the particles removed being allowed to collect in the bottom of the filter vessel for continuous or periodic removal. Sonic, ultrasonic, or subsonic removal may also be employed, as has been described in for example EP-A-551951.

A problem common to many filtration systems is the possibility of failure of the filter element/seal or one or more filter elements/seals in a bank or sealing device thereof. In EP-A-601733 a solution was proposed for better sealing the filter elements when these are of a ceramic type, typically for candle filters.

Sealing problems are further increased because of swivel movements of the filter elements, for instance as a consequence of pressure fluctuations during back-flush procedures. Swivel motions of the filter elements further may lead to damage or fracture of the filter elements, since these filter elements are preferably closely located to each other. A solution for this problem was proposed in WO 87/07180 wherein the filter elements were provided with a blind hole at their bottom end, which fitted in a pin-shaped limiting element. The pin-shaped elements are mounted on a holder device that is not described further, other than in the Figure. The pin-shaped element can be provided with an elastic cap, allowing moderate swivel motion with avoiding damaging of filter elements by the pin-shaped element. This device proved to be a good solution for avoiding damage, but in term of efficient operation this device appears to be disappointing. The main problem resides in the fact that substantial amounts of solid material in the form of slug or clumps clog the holder device comprising the pin-shaped elements in such a serious manner that useful operation is only possible after regular and manifold cleaning. Furthermore, clogging diminished the effective surface of the filter elements and may lead to fracture of said filter elements. Practically and economically this situation is very undesired.

A need has existed, therefore, for a filter arrangement, which continues its operation for a sufficient long process time with avoiding damaging failure of one or more filter elements. The present invention satisfies this need, overcoming the problem of clogging in a novel and efficient manner.

It is an object of the invention to provide a filter assembly, a filter vessel comprising a longitudinal vessel body having upper and lower ends; a master tube sheet separating the area of the vessel body containing fluid and the area containing fluid and solid particles; at least one inlet port in said vessel body for admitting fluid to be filtered from solid particles; outlet ports in said vessel for discharging the fluid and for discharging the solid particles and said filter assembly, and at least one filter grid that is used in said filter assembly. To this end the invention pertains to a filter assembly comprising a filter grid, characterized in that the filter grid has a plurality of grid elements together forming the filter grid, wherein at least a portion of the cross-section of the grid elements between two adjacent filter elements is pointiform. The point of the grid elements are directed in the opposite direction of the gravitational force in order to prevent piling up of solid material onto the grid elements. The filter assembly is used for separating a fluid and solid particles, preferably solid particles with an angle of repose between 30 and 90°, more particularly between 40 and 70°. Solid particles having such an angle of repose is for example flyash. The angle of repose is the slope shown when a powder is dumped freely in a heap on a horizontal plane as described on pages 53–56 of "The dynamics of fine powders", K. Rietema, 1991, Elsevier Science Publishers Ltd. The filter vessel according to the present invention is particularly useful in the purification of flyash from syngas. Syngas, which mainly comprises carbon monoxide, hydrogen, nitrogen, carbon dioxide, and water, is a common gas that is obtained in coal gasification processes. The filter vessel of the invention can be used as a unit in a coal gasification plant for producing cooled purified syngas. The syngas may suitably be used as quenching gas in the gasifier itself. Preferably it is further processed in gas treating processes for removal of sulfur components before it is used in preferably chemical or power applications. Examples of chemical applications are the preparation of ammonia and methanol and as feedstock for Fischer-Tropsch processes. The flyash may be used as a binder in construction materials such as ceramic materials.

The invention is further explained in the following, not restricting, Figures.

Figure 1:
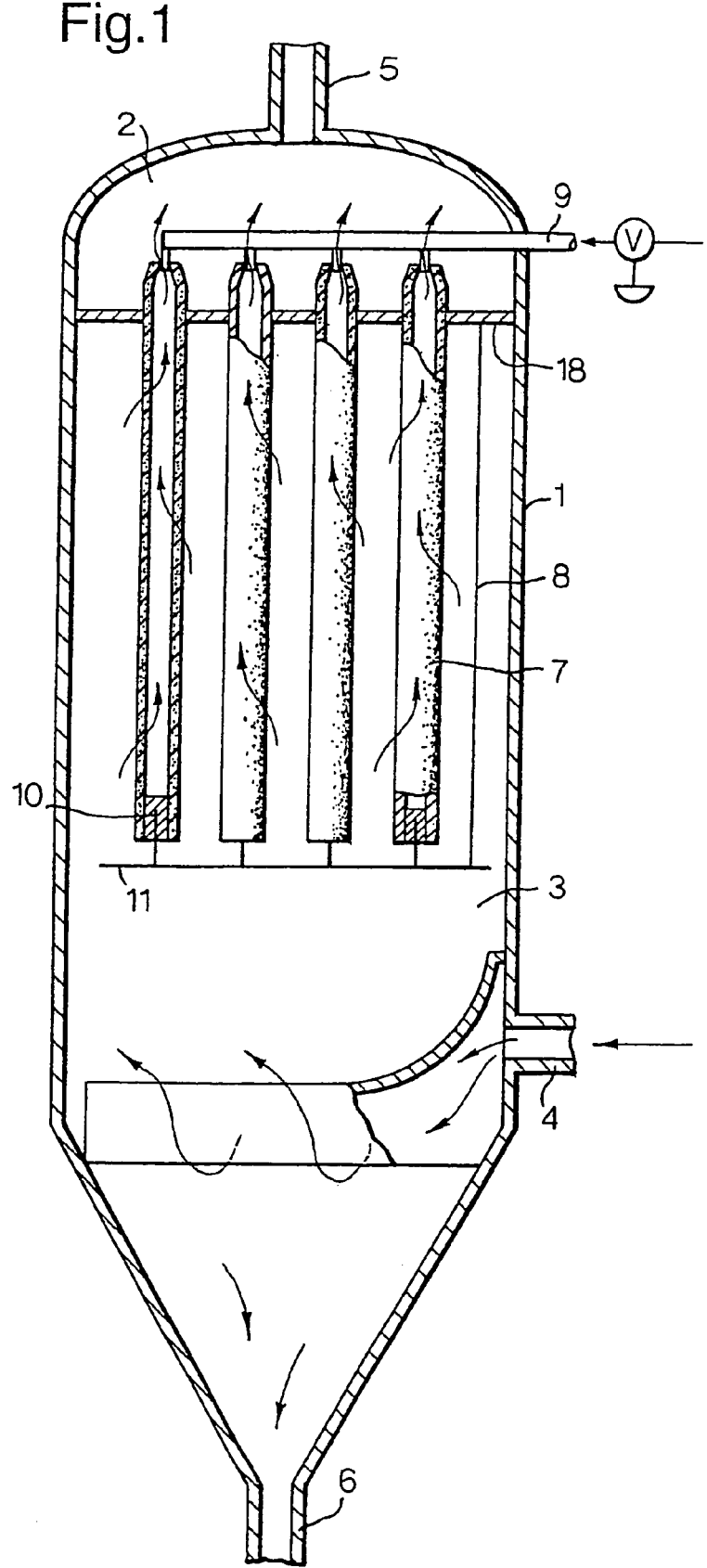
FIG. 1 shows a filter vessel with a sealing device, a master tube sheet; a filter element, a filter support, and a filter grid.

In FIG. 1 a longitudinal vessel body 1 having upper end 2 and lower end 3, inlet port 4 in said vessel body for admitting fluid to be filtered from solid particles, outlet ports in said vessel for discharging the fluid 5 and for discharging the solid particles 6. The vessel contains a master tube sheet 18 separating the area of the vessel body 1 containing fluid and the area containing fluid and solid particles. The vessel further contains a plurality of filter elements 7 (for clarity only four filter element have been depicted), provided with backflushing means 9. The filter elements 7 can be made of porous ceramic or porous metallic materials. The lower ends of the filter elements 7 are attached to a filter support 10, which is comprised in the filter grid 11. The vessel 1 may contain one filter grid 11 with filter elements 7, but usually the vessel 1 contains a plurality of filter grids 11, for instance 6 to 24 filter grids placed in the vessel body 1, each with for example between 30–50 filter elements 7.

Figure 2:
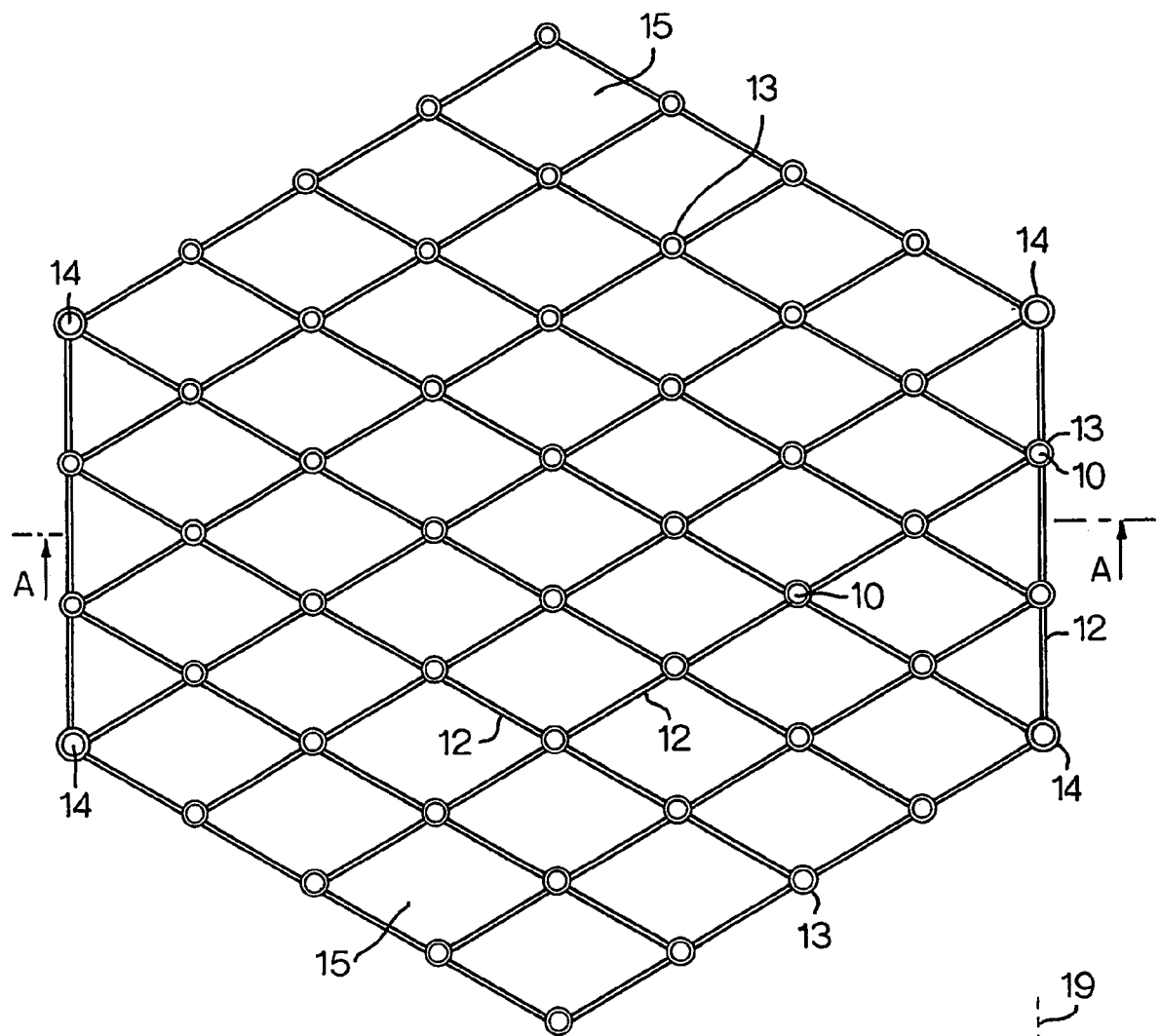
FIG. 2 shows a top view of a filter grid.

In FIG. 2, a specific embodiment of a filter grid is shown. The filter grid is composed of grid elements 12. Each form that fits in the filter vessel can be used. In this example the form is hexagonal, comprising 18 grid elements 12. According to the conformation of this example a total of 52 intersection points 13 are obtained, 4 of which are used as anchoring points 14 for fixing the grid to for example the master tube sheet 18 via support 8 or directly in the filter vessel. In this example all other points of intersection 13 are provided with a filter support 10, which in this example has the form of a pin-like extension. Of course, at one or more of the points of intersection 13 the support can be deleted. It is preferred that more than 90% of the points of intersection 13 of grid elements 12 are accommodated with a filter support 10.

In this embodiment openings of the form of a parallelogram are obtained with four points of intersection 13 as the corner points. A space around the point of intersection of the size of the cross-section of a filter element will be occupied by said filter element 7 when it is placed onto or in the filter support 10. The ratio of the total area of the horizontal cross-section at the maximum thickness of the grid elements 12 (which is shown in the top view of FIG. 2): the total area of open parts 15 of the filter grid 11 is less than 1:1.5, preferably 1:(1.5–15), and more preferably 1:(3.5–5). This ratio is of importance to prevent the open parts 15 from clogging. The size of the open parts is usually at least 7 times, preferably 9 to 12 times, larger than the size of the particles or the clumps of particles that must pass these open parts 15. The pin-shaped element forming filter support 10 or the recess of the filter element 7 in which the pin-shaped element that forms filter support 10 fits, may be provided with an elastic cap as described in WO 87/07180.

Figure 3:
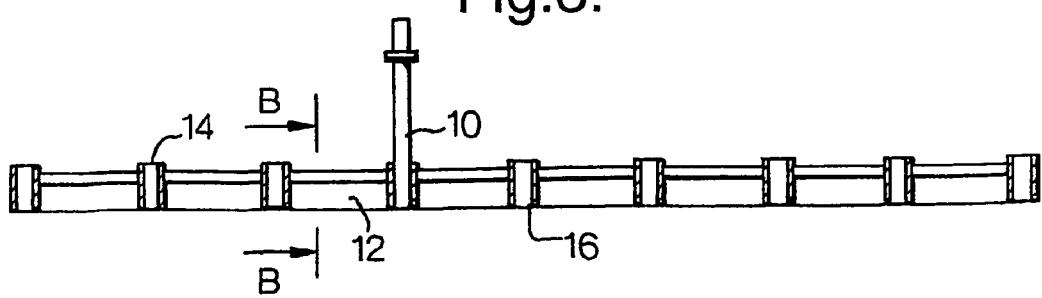
FIG. 3 shows a cross-sectional view along line A—A.

In FIG. 3 a cross-section along line A—A of FIG. 2 shows the points of intersection 13, the grid elements 12, and a pin-shaped extention of filter support 10 that is fitted in a hole or recess 16 provided on the point of intersection 13.

Figure 4:
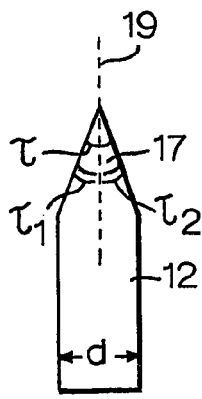
FIG. 4 shows a cross-sectional view of a grid element along line B—B.

In FIG. 4 a cross-sectional view is given of a grid element 12. The grid element has a point 17, the angle $\tau$ of which is equal or smaller than $2*(90-\alpha)$ and the angles $\tau_1$ and $\tau_2$ of each of the edges of said point with a perpendicular line 19 are smaller than $(90-\alpha)$, wherein $\alpha$ stands for the angle of repose of the solid particles. In FIG. 4 angle $\tau$ is about 30° and the angles $\tau_1$ and $\tau_2$ are each about 15°, which makes this embodiments suitable for separating solid particles with an angle of repose of 75° or less. These angles are necessary to avoid accumulation of solid material on the grid elements 12. When solid material accumulates it may finally form a contact between to filter elements 7, thereby increasing the danger of damage or fracture thereof. The thickness d of the grid element 12 is the maximum thickness of said grid element 12. This thickness is preferably as small as possible, but the thickness must be sufficient to secure the rigidity of the filter grid 11. Preferably, the grid elements 12 are smoothened, for instance by polishing, to further improve its property of avoiding accumulation of solid material on the grid elements 12.

I claim:

1. A filter assembly comprising a plurality of longitudinal elongated filter elements that are suitable for separating fluid from solid particles, having an open upper end sealed into a sealing device and a closed bottom end attached to a filter support that is mounted on a filter grid, in which the filter grid has a plurality of grid elements together forming the filter grid, wherein at least a portion of the cross-section of the grid elements between two adjacent filter elements is pointiform.

2. The filter assembly of claim 1, wherein the cross-section of the grid element is pointiform over at least the total portion of the grid element between the filter elements.

3. The filter assembly of claim 2, wherein the point of the cross-section of the grid element has an angle $\tau \leq 2*(90-\alpha)$, and the angles $\tau_1$ and $\tau_2$ of each of the edges of said point with a perpendicular line are $\leq (90-\alpha)$, wherein $\alpha$ stands for the angle of repose of the solid particles.

4. The filter assembly of claim 3, wherein the filter elements are at least substantially vertically mounted.

5. The filter assembly of claim 4, wherein the surface of the grid element is smoothened.

6. The filter assembly of claim 5, wherein the filter support is a longitudinal elongated extension that fits into a recess provided in the filter element.

7. The filter assembly of claim 6, wherein the filter support is placed on a point of intersection of at least two grid elements.

8. The filter assembly of claim 7, wherein the ratio of the total area of the horizontal cross-section at the maximum thickness of the grid elements:the total area of open parts of the filter grid is less than 1:1.5.

9. The filter assembly of claim 8, wherein the ratio of the total area of the horizontal cross-section at the maximum thickness of the grid elements:the total area of open parts of the filter grid is between 1:3.5 and 1:5.

10. A filter grid for accommodating a plurality of filter elements that are suitable for separating fluid from solid particles, said filter grid comprising filter supports, having at least a portion of the cross-section of the grid elements between two adjacent filter elements that is pointiform.

11. A filter vessel comprising:
  a longitudinal vessel body having upper and lower ends;
  a master tube sheet separating the area of the vessel body containing fluid and the area containing fluid and solid particles;
  at least one inlet port in said vessel body for admitting fluid to be filtered from solid particles;
  outlet ports in said vessel for discharging the fluid and for discharging the solid particles; and
  at least one filter assembly comprising a plurality of longitudinal elongated filter elements that are suitable for separating fluid from solid particles, having an open upper end sealed into a sealing device and a closed bottom end attached to a filter support that is mounted on a filter grid, in which the filter grid has a plurality of grid elements together forming the filter grid, wherein at least a portion of the cross-section of the grid elements between two adjacent filter elements is pointiform.

12. The filter assembly of claim 1, wherein the point of the cross-section of the grid element has an angle $\tau \leq 2*(90-\alpha)$, and the angles $\tau_1$ and $\tau_2$ of each of the edges of said point with a perpendicular line are $\leq (90-\alpha)$, wherein $\alpha$ stands for the angle of repose of the solid particles.

13. The filter assembly of claim 1, wherein the filter elements are at least substantially vertically mounted.

14. The filter assembly of claim 1, wherein the surface of the grid element is smoothened.

15. The filter assembly of claim 1, wherein the filter support is a longitudinal elongated extension that fits into a recess provided in the filter element.

16. The filter assembly of claim 1, wherein the filter support is placed on a point of intersection of at least two grid elements.

17. The filter assembly of claim 1, wherein the ratio of the total area of the horizontal cross-section at the maximum thickness of the grid elements:the total area of open parts of the filter grid is less than 1:1.5.

18. The filter assembly of claim 1, wherein the ratio of the total area of the horizontal cross-section at the maximum thickness of the grid elements:the total area of open parts of the filter grid is between 1:3.5 and 1:5.

19. The filter grid of claim 10, wherein the filter supports are longitudinal elongated extensions that fit into a recess provided in the filter elements.

* * * * *